United States Patent [19]

Brooks et al.

[11] Patent Number: 4,741,908

[45] Date of Patent: May 3, 1988

[54] ENROBED FOOD PRODUCTS AND METHOD OF MANUFACTURE

[75] Inventors: Arthur W. Brooks, Richardson, Tex.; Gerald R. Popenhagen, Middleton; Donna J. Rentschler, Madison, both of Wis.

[73] Assignee: Oscar Mayer, Madison, Wis.

[21] Appl. No.: 914,398

[22] Filed: Oct. 2, 1986

Related U.S. Application Data

[63] Continuation-in-part of Ser. No. 761,468, Aug. 1, 1985, abandoned.

[51] Int. Cl.$^4$ ............................................. A21D 13/00
[52] U.S. Cl. ..................................... 426/95; 426/283; 426/556
[58] Field of Search ................... 426/94, 95, 283, 275, 426/556

[56] References Cited

U.S. PATENT DOCUMENTS 4,207,348  6/1980  Vermilyea et al. ................... 426/95

OTHER PUBLICATIONS

Child et al., Mastering the Art of French Cooking, vol. 2, 1974, pp. 113–118 and 459–462.

*Primary Examiner*—George Yeung
*Attorney, Agent, or Firm*—Joseph T. Harcarik; Thomas R. Savoie; Daniel J. Donovan

[57] ABSTRACT

An enrobed food product having improved freezer shelf-life wherein the inner filling material is pre-frozen and shaped as to be substantially smooth surfaced and devoid of edges. The dough is a composite dough having fats or margarine interposed between a plurality of dough layers.

14 Claims, 2 Drawing Sheets

ENROBED FOOD PRODUCTS AND METHOD OF MANUFACTURE

BACKGROUND OF THE INVENTION

This is a continuation-in-part of our prior application, Ser. No. 761,468 filed Aug. 1, 1985, now abandoned.

FIELD OF THE INVENTION

This invention relates to dough enrobed or encased food products and more particularly, to frozen, enrobed food products with an improved freezer shelf-life and the method for manufacturing them.

DESCRIPTION OF THE PRIOR ART

The past five to ten years has seen a rise in the marketability of frozen food products in general. Food producers are entering the arena or are expanding their existing lines of frozen foods.

A wide variety of edible products have been made by commercial bakers and food producers which comprise a filling of edible material, surrounded or enclosed by dough. The dough can either be cooked or uncooked when frozen.

As the product lines become more varied and complex the food industry has had to cope with the problem of enrobing a liquid or semiliquid core, such as a meat and gravy or a meat or vegetable and sauce combination within an outer covering of dough. The core or filling material is difficult to control during the enrobing process and the moisture from the filling material can cause the dough to become soggy before freezing and not cook properly at the time of final preparation. One solution is to formulate the liquid portion with stabilizers to impart a higher degree of viscosity and body thereto. A more useful solution is to freeze the inner core material prior to enrobing with the outer dough material.

Another problem associated with the dough enrobed food products is the drying effect of the freezer environment upon the dough. The areas of dryness in the dough inhibit or prevent the dough from properly rising and evenly browning during baking. Additionally, after cooking, those freezer induced dry spots are tough and detract from the eating enjoyment of the product.

Still another shelf-life problem is the migration of moisture within the filling material into the enrobing dough material during storage in the freezer. This moisture migration results in the dough appearing greyish and somewhat translucent after cooking instead of a golden brown. The organoleptic properties are also adversely affected.

Several patents have issued that deal with the art of combining dough and liquid filling material. U.S. Pat. No. 3,532,510 issued to Zimmerman discloses a refrigerated dough product containing stable filling material in which the dough surrounds and encloses a filling material. The approach used by Zimmerman does not teach the use of a frozen inner filling material nor the freezing of the final product.

Canadian Patent No. 949,375 issued to Ott et al. uses a different approach and teaches a method of producing a storable toaster sandwich with a wide range of fillings which have a high moisture content and discrete chunks of solid foods in addition to puree-type fillings. However, Ott et al. merely places the filling material between two slices of baked dough which is then sealed. The Ott et al. product is only re-heated by the end user as it has already been cooked by the producer. Such a product is still susceptible to freezer drying and moisture migration.

Examples of the frozen filling approach are U.S. Pat. Nos. 4,207,348 and 4,020,188. Neither of these teachings address the problems associated with the pre-frozen filling material approach that the applicant's invention addresses, namely improved freezer shelf-life for a frozen, uncooked, enrobed food product.

The Vermilyea et al. U.S. Pat. No. 4,207,348 teaches the process of inserting a pre-sized, frozen layer of interior filling material in an envelope made from a dough sheet and then proofing and baking prior to sale to the end user. In the Vermilyea et al. patent the storage of the product occurs in the product's cooked state and therefor eliminates the visual effects associated with moisture migration but not the problem itself.

U.S. Pat. No. 4,020,188 issued to Forkner discloses a method for making a food product having an inner filler of frozen dessert and an outer layer of dough. The filling is enclosed within a layer of farinaceous dough which has an inner layer forming a protective backing. The protective backing is used to prevent infusion or soaking between the inner filling material and the dough material after the dough is cooked during production and before the entire enrobed food product is frozen.

Hirahara in U.S. Pat. No. 3,698,201 teaches a method of freeze molding sliced material. The sliced material lines the flat interior surface of a mold and the mold is subsequently filled with a liquid and the combination is hereafter frozen in the mold.

Here again, the purpose of the invention is not to teach nor is it obvious that a particularly shaped, molded, inner filling material when used in combination with a composite dough sheet will result in an enrobed food product having a freezer shelf-life significantly longer than such a product produced using teachings previously known in the art. Additionally, Hirahara does not disclose an enrobed product or the need for the shape of the inventor's frozen inner filling material.

A composite dough sheet similar to that used by the present invention is known and used in the industry. U.S. Pat. No. 4,275,082 issued to Dougan discloses the use of a puff pastry wherein the frozen filling material is placed upon the dough and the dough rises up around the filling during baking. However, there is no suggestion in Dougan that an enrobed food product with an extended shelf-life is possible when a fat/dough layered composite dough is used separately or in combinations with a specifically shaped frozen inner filling material.

Accordingly, the present invention discloses an enrobed food product devoid of the problems of freezer dried dough due to the pre-freezing of a solid and liquid or semi-liquid core and, therefore, exhibiting extended freezer shelf-life properties as well as the method of producing such a product.

SUMMARY OF INVENTION

In general, it is an object of the present invention to provide an enrobed food product where the inner filling material is frozen prior to enrobing with dough such that the dough is not stretched or squeezed about the filling material and the enrobed food product is less susceptible to freezer drying and moisture migration when stored in a freezer environment.

Another object of the invention is to provide a method of producing an enrobed food product of improved freezer shelf-life.

Another object of the invention is to provide a method of producing a frozen inner filler material having rounded and substantially smooth surfaces.

Still another object of the invention is to provide a method of producing a frozen inner filler material having substantially smooth surfaces, lacking prominent edges and consisting of sliced solid edible material and liquid.

These and still further objectives are addressed hereinafter.

In general, the foregoing objectives are achieved by freezing the inner filling material in a semicircular, trough shaped mold. The frozen inner filling material is then positioned on a shaped composite sheet of dough and the dough is then caused to enclose the frozen inner filling material without being stretched or pinched about the filling material. The composite sheet of dough comprises fats or margarine interposed between layers of dough. The fat/margarine layers act as a moisture barrier in the freezer and therefore care must be taken to maintain the structural integrity of the dough throughout the manufacturing process of the enrobed food product.

DETAILED DESCRIPTION OF THE INVENTION

Since the present invention comprises an assemblage of numerous components, the following discussion will detail the development of each component up to the point of assemblage and will then describe that process.

Figure 4:
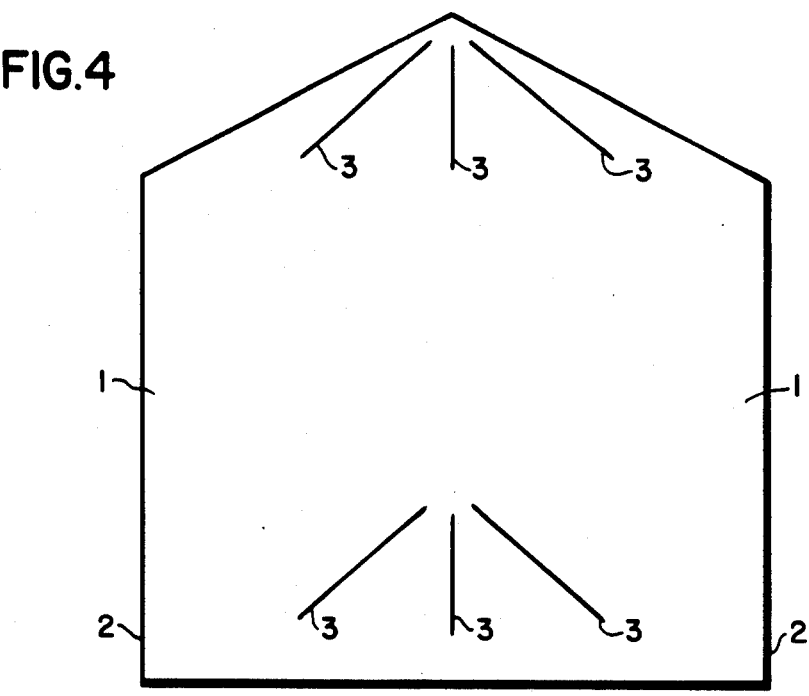
FIG. 4 is a view of the sheeted composite dough cut to the preferred shape for enrobing.
Figure 5:
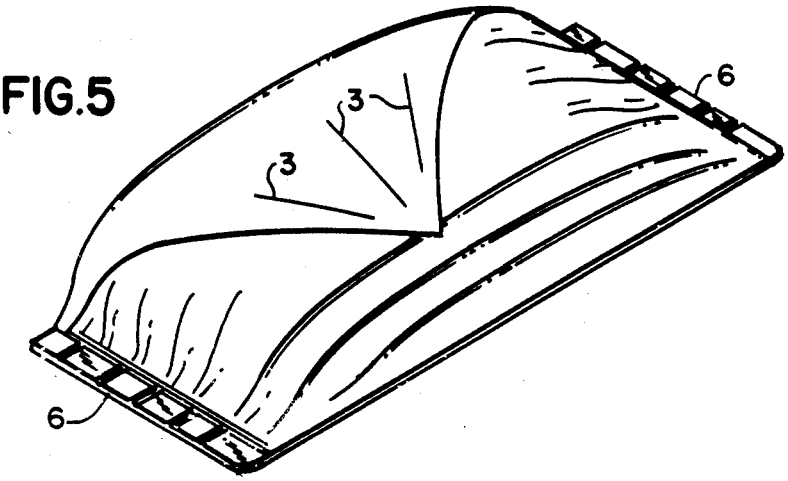
FIG. 5 is a perspective view of the finished enrobed product.

A leavened dough is prepared and readied for sheeting. The dough is then sheeted or rolled to approximately ⅜ inch thick. Beginning at one edge of the dough, a shortening such as margarine or an edible fat/oil is spread over two-thirds (⅔) of the sheet of dough. The one-third (⅓) of the sheet of dough (without margarine or fat/oil) is folded over onto the top of the middle third of the sheet. Next, the remaining margarine or fat/oil coated third of the sheet of dough is folded on top of the other two. The dough is again sheeted to approximately ⅜ inch thick. As before fold ⅓ of the dough into the center third and the remaining ⅓ is folded on top of the other two thirds. The sheeting and folding can be repeated as many times as is desirable. Preferably the sheeting and folding is repeated two (2) more times. The composite sheet of dough 1 is sheeted or rolled to a final thickness of from about 1 mm to about 4 mm with the preferred thickness being about 2 mm. The composite sheet of dough may now be cut into any shape desired and venting holes 3 or slices may also be made at this time. The preferred shape 2 for the dough is that of a pentagon and containing venting holes 3 as seen in FIG. 4.

Figure 1:
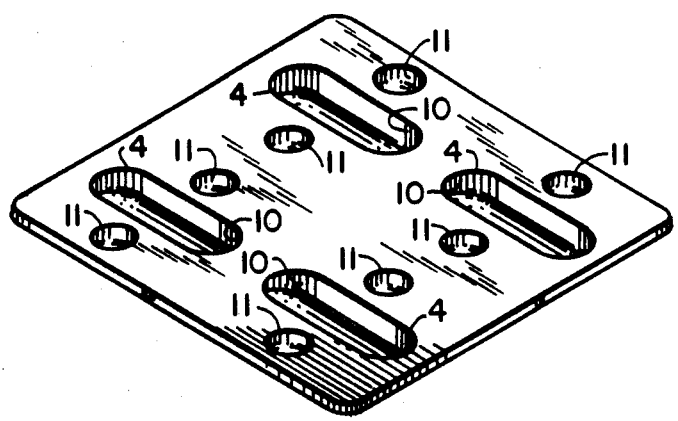
FIG. 1 is an overhead view of a preferred embodiment of a mold tray for forming the inner filling material.
Figure 2:
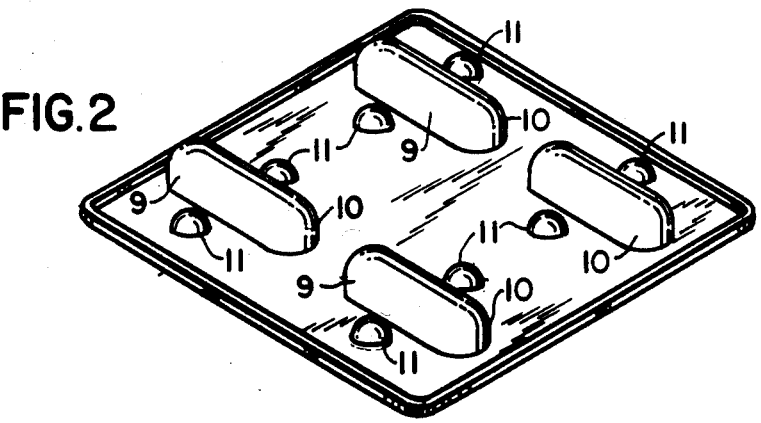
FIG. 2 is an underside view of FIG. 1.

To prepare the shaped frozen inner filling material 7 it is preferable to use an elongated semi-circular mold 4 to accomplish the shape. The inventors have found that, in order to maintain the structural (layered) integrity of the composite sheet of dough 1, the frozen inner filling material must be devoid of most irregularities and edges 8 that will compress the dough layers together during the enrobing process. This is accomplished by mixing or preparing the desired filling material (sauces, solid food chuncks, etc.) and placing said material into an appropriately sized, elongated, semi-circular mold FIG. 1. A prefered size mold is an approximately 4 inch by 2 inch diameter semicircular mold. The prefered mold has substantially smooth side walls 9 and rounded end walls 10. Should it be desirable to have the inner filling material comprise sliced meats, cheese or the like, and a sauce or gravy, then the sliced item is placed in the mold 4 such that the mold 4 is lined with the item or items and a portion hangs over the ends of the mold 4. The sauce or gravy is then poured into the mold 4 (on top of the slices) and the overhanging portion of the sliced item is folded over to cover the sauce or gravy. The indentations 11 on the mold tray are to facilitate the process of grasping the overhanging slices. The inner filling material is then frozen until the interior of the material is below the latent heat of the material and the material is rigid. It has been found that the temperature of the inner filling material should be at least below about 25° F. and preferably below about 15° F.

Figure 3:
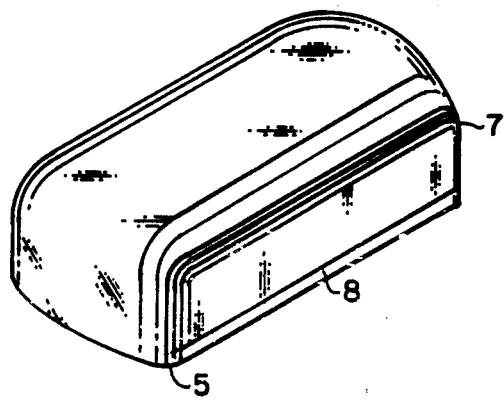
FIG. 3 is a perspective view of the frozen inner filling material prior to enrobing with the composite dough.

Once the inner filling material 7 is sufficiently frozen it may be removed from the mold FIG. 3. The frozen inner filler material 7 is placed on the composite sheet of dough 1 (described above) with the flat surface 5 down. The composite dough 1 is wrapped (draped) around the filling material in such a manner that it is not pinched, stretched or otherwise compacted. It is imperative that the structural (layered) integrity of the composite dough be maintained throughout the enrobing process to maximize the shelf-life. If compressed about irregularities on the surfaces of the frozen filling material the fats/oil or margarine is squeezed or migrates away from the area of compression leaving the dough more suseptible to freezer burn and moisture migration from the filling material. If venting holes 3 are present then the dough is wrapped about the frozen inner filling material such that the venting holes are on the upper rounded surface of the enrobed product and are aligned with one another. The edges are preferably crimped 6 to seal and the enrobed food product may now be glazed, as with an egg wash and seeded as with sesame seeds. The enrobed product is then frozen and may then be packaged. A preferred packaging method is to package in barrier film backflushed with an inert gas such as $N_2$, $CO_2$, etc., or combinations thereof.

Freezer shelf-life studies were conducted using enrobed food products prepared with (1) a shaped, frozen inner filling material and a non-laminated bread-like dough; and (2) a shaped, frozen inner filling material and the laminated composite dough of the present invention. The non-laminated enrobed food product showed visual deterioration between 8–12 weeks when stored at temperatures of +10° F. and 0° F. The enrobed food product of the present invention showed no visual deterioration until 14–18 weeks when stored at +10° F. and 0° F.

The following example is given by way of illustration only and is not to be construed as limiting the invention in any way.

EXAMPLE

Composite Dough

| Ingredients | Bakers % |
| --- | --- |
| Bleached, Bromated, Enriched Flour | 100 |
| Water | 60.0 |
| Sugar | 6.0 |
| Shortening | 5.0 |
| Yeast | 5.0 |
| Gluten | 3.0 |
| Dry Milk | 3.0 |
| Salt | 2.0 |
| Dough Conditioner | 0.5 |
| Roll-in Margarine | 25* |

(*based on total weight of dough)

Dough Preparation

Place dry ingredients, shortening and yeast together in a verticle mixer equipped with a dough hook. Add the water and mix 1 minute on low speed and then 8 minutes on high speed. Select a water temperature to give a final dough temperature of 55° F.

Remove dough from the mixer and sheet to a rectangle approximately ⅜" thick on a reversible sheeter, which rolls the dough like a rolling pin. Mentally divide the dough into thirds and spread the roll-in margarine on ⅔'s of the dough. Fold the third of the dough without margarine on top of the middle third, then fold the remaining third with margarine on top of the other two. Sheet to ⅜" thickness as before, divide into thirds and then fold the two end thirds into the center as before. Repeat sheeting and folding two additional times. Sheet composite dough to 2 mm final thickness and cut into a pentagon shape and cut venting holes.

Sliced Turkey, Cheese Sauce with Broccoli Filling

| Ingredients | Total Product % | Component % |
| --- | --- | --- |
| Sliced Cooked Turkey (2 slices) | 43.75 | |
| Cheese Sauce with Broccoli | 56.25 | |
| Frozen Chopped Broccoli | | (40) |
| Cheese Sauce: | | (60) |
| Whole Milk | | [31.0] |
| Diced Cheese, | | [25.0] |
| Modified Food Starch | | [2.5] |
| Butter | | [1.25] |
| Other Seasoning | | [0.25] |

Sauce Preparation

Mix milk with the starch and seasonings. Add butter and diced cheese. Heat in a jacketed kettle at 200°-225° F. with agitation until sauce thickens (160°-190° F.). Turn off the heat and add broccoli to sauce and agitate to mix. Cool to 100° F. or below.

Line a 4 inch long by 2 inch diameter semicircular mold with 2 slices of turkey so that approximately 2 inches of sliced turkey hangs over the sides of the mold. Place approximately 2.00 oz. of sauce with broccoli into the mold (on top of the turkey). Fold the overhanging turkey flaps over to cover the sauce. Place filled mold into a freezer to 0° F. internal temperature. Remove frozen filling material from mold and place on dough. Wrap the dough loosely about the frozen inner filling material such that the vent holes of the upper angular portion of the dough lay across the top of the enrobed product and are aligned with the vent holes in the lower rectangular portion of the dough. Crimp the two side edges to seal the dough together. Freeze the now enrobed food product in −20° F. air and package in barrier film backflushed with $CO_2$ gas.

The packaged frozen, enrobed products may now be further packed and sealed, labeled cartons for sale.

The enrobed food product produced by the above described process showed no visible signs of deterioration in freezer shelf-life tests until 14 weeks when stored at +10° F. and 0° F. Off-flavors were not detected until 20 weeks at +10° F. and 0° F.

A similar product (Turkey and Cheese) produced in a manner similar to the teachings of the Vermilyea et al. U.S. Pat. No. 4,207,348, and not using a composite sheet of dough, showed visible signs of deterioration at 8 weeks when stored at +10° F.

Additional shelf-life testing, using various inner filling materials and formulations has revealed that the improved enrobed food product of the present invention now has its shelf-life influenced more by inner filling material formulations than by moisture migration and freezer burn. In other words, the inner filling material spoils before the enrobed food product is effected by freezer burn and moisture migration.

We claim:

1. A method for the manufacture of a frozen enrobed food product having an inner filling material and an enveloping outer layer of uncooked dough which comprises: freezing an inner filling material into a shape having substantially smooth surfaces wherein the edges of said inner filling material are rounded; forming a composite sheet of farinaceous dough of from about 1 mm to about 4 mm thickness wherein the composite sheet comprises layers of an edible shortening selected from the group consisting of edible fats, oils and margarine interposed between layers of dough; enveloping the frozen, shaped, inner filling material within the uncooked composite sheet of dough such that said fats or oils or margarine in the composite dough is not caused to migrate away from between said dough layers and said composite dough substantially maintains its layered integrity throughout areas of contact with said filling material; thereafter freezing and packaging said enrobed food product.

2. A method for the manufacture of a frozen enrobed food product as claimed in claim 1 wherein said inner filling material is frozen into an elongated loaf shape having at least one rounded longitudinal surface substantially semi-circular in shape and at least one other longitudinal surface substantially flat.

3. A method for the manufacture of a frozen enrobed food product as claimed in claim 1 wherein said inner filling material is frozen in a shape having three substantially smooth, flat longitudinal surfaces and one semicircular shaped surface rounded edges.

4. A method for the manufacture of a frozen enrobed food product as claimed in claim 1 wherein said inner filling material is shaped and frozen until substantially rigid.

5. A method for the manufacture of a frozen enrobed food product as claimed in claim 4 wherein said frozen inner filling material is below about 25° F.

6. A method for the manufacture of a frozen enrobed food product as claimed in claim 4 wherein the temperature of said frozen inner filling material is below about 15° F.

7. A method for the manufacture of a frozen enrobed food product as claimed in claim 1 wherein the thickness of the composite sheet of dough is about 2 mm.

8. A method for the manufacture of a frozen enrobed food product as claimed in claim 7 that further comprises cutting vents in the upper overlapping portion of the composite sheet of dough such that the vents are on the upper rounded surface of the enrobed food product and are aligned with vents in the lower overlapped portion of the sheet of dough.

9. A method for the manufacture of a frozen enrobed food product as claimed in claim 1 wherein said freezing of said inner filling material comprises forming said shape by use of a mold.

10. A method for the manufacture of a frozen enrobed food product as claimed in claim 9 wherein said frozen inner filling material further comprises an outer layer of at least one sheet or slice of an edible food product and an inner core of a frozen edible liquid.

11. A method for the manufacture of a frozen enrobed food product as claimed in claim 10 wherein said frozen inner filling material further comprises an outer layer of at least one sheet or slice of an edible food product and an inner core of a frozen edible semi-liquid material.

12. A frozen enrobed food product that comprises: a prefrozen shaped inner filling material having substantially smooth surfaces free of dough compressing irregularities or protrusions and wherein the edges of said shaped inner filling material are rounded; and an outer layer of a composite, uncooked dough wherein the composite dough further comprises layers of farinaceous dough with an edible shortening selected from the group consisting of fats and margarine interposed therebetween, said composite dough substantially free of areas wherein said edible shortening is compressed away from or has migrated away from between said dough layers.

13. A food product as claimed in claim 12 wherein said shaped, frozen inner filling material comprises an inner core of sauce and an outer layer of meat or a meat product.

14. A food product as claimed in claim 12 wherein said outer layer is cheese or a cheese product.

* * * * *